(12) United States Patent
Yoshioka (10) Patent No.: US 6,283,731 B1
(45) Date of Patent: Sep. 4, 2001

(54) VEHICLE FUEL SUPPLYING APPARATUS (75) Inventor: Hiroshi Yoshioka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/486,817
(22) PCT Filed: Jul. 2, 1998
(86) PCT No.: PCT/JP98/02972
 § 371 Date: Mar. 2, 2000
 § 102(e) Date: Mar. 2, 2000
(87) PCT Pub. No.: WO00/01941
 PCT Pub. Date: Jan. 13, 2000
(51) Int. Cl.[7] .................................................... F04B 17/00
(52) U.S. Cl. ...................... 417/423.3; 123/509; 123/510; 137/38; 137/44; 137/574; 137/576
(58) Field of Search ........................ 417/423.3; 123/509, 123/510; 137/38, 44, 574, 576

(56) References Cited
U.S. PATENT DOCUMENTS 4,354,521 * 10/1982 Harde ................................... 137/571
4,966,522 10/1990 Koyama .
5,718,208 2/1998 Brautigan et al. .
5,988,213 * 11/1999 Yoshioka ............................. 137/590

FOREIGN PATENT DOCUMENTS 1-37178 11/1989 (JP) .
PCT/JP97/04214 11/1997 (JP) .

* cited by examiner

Primary Examiner—Charles G. Freay
Assistant Examiner—Eric D. Hayes
(74) Attorney, Agent, or Firm—Sughrue, Mion, Zinn, Macpeak & Seas, PLLC (57) ABSTRACT

A fuel supplying apparatus for a vehicle for supplying fuel including an in-tank type fuel pump 7 provided in a sub-tank 5 inside a main tank 1 and a tubular fuel holding case 21 surrounding a suction filter portion 20 of this fuel pump 7 and having an opening portion 21B which is open in an opposite direction to a forwardly moving direction of the vehicle, so as to supply fuel 2 to outside the main tank 1 through a delivery pipe 16 by means of the fuel pump 7. The fuel 2 can be supplied to an engine even during the quick braking of the vehicle when the amount of fuel 2 is small without increasing the number of component parts of the apparatus.

10 Claims, 7 Drawing Sheets

VEHICLE FUEL SUPPLYING APPARATUS

TECHNICAL FIELD

The present invention relates to a fuel supplying apparatus for a vehicle of an in-tank type in which a fuel pump is incorporated in a fuel tank, and more particularly to a fuel supplying apparatus for a vehicle which is capable of supplying fuel even when the vehicle is braked quickly.

BACKGROUND ART

Figure 7:
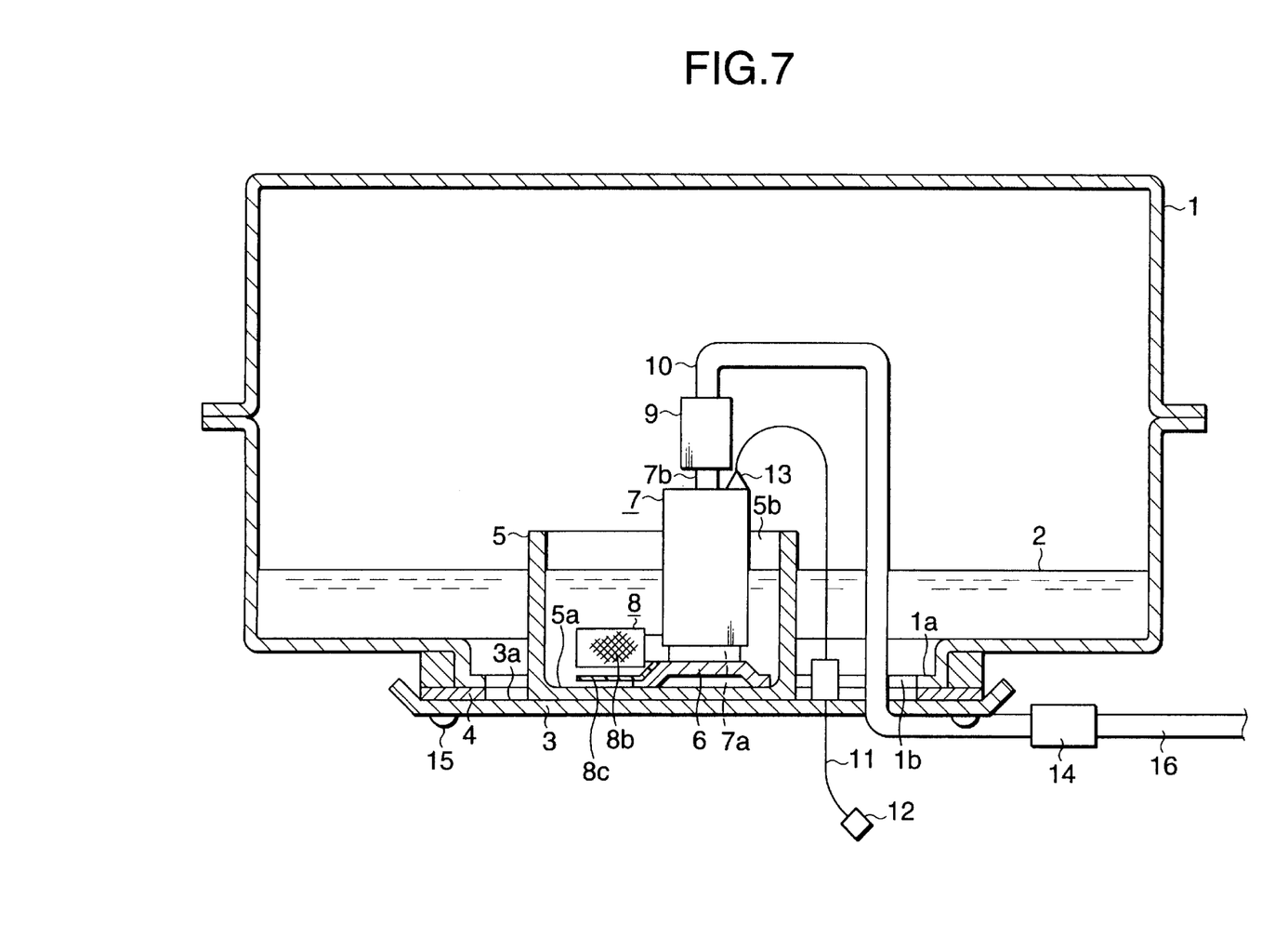
FIG. 7 is a side cross-sectional view illustrating a conventional fuel supplying apparatus for a vehicle.

FIG. 7 is a side cross-sectional view illustrating a conventional fuel supplying apparatus for a vehicle disclosed in, for example, Japanese Utility Model Examined Publication No. 37178/1989. In FIG. 7, reference numeral 1 denotes a main tank for storing fuel 2, 1a denotes a bottom wall of the main tank 1, and 1b denotes a bottom wall opening provided in the bottom wall 1a of the main tank 1. Numeral 3 denotes a setting plate which is oil-tightly attached to the bottom wall opening 1b by means of bolts 15 through packing 4.

Figure 8:
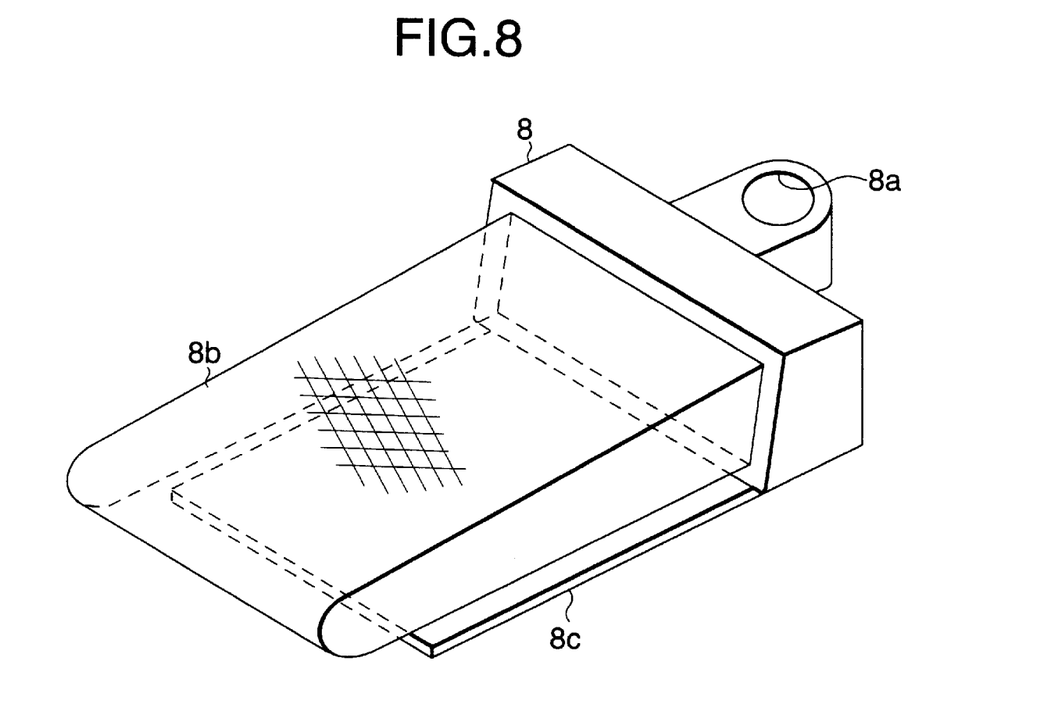
FIG. 8 is an enlarged perspective view of a suction filter portion of the fuel supplying apparatus for a vehicle shown in FIG. 7.

A sub-tank 5 which is inserted in the main tank 1 is provided on an inner surface 3a of the setting plate 3, and an in-tank type fuel pump 7 which is attached by a pump holder 6 is provided on an inner bottom surface 5a of the sub-tank 5. FIG. 8 is an enlarged perspective view of a suction filter portion of the fuel supplying apparatus for a vehicle shown in FIG. 7. In FIG. 8, numeral 8a denotes an opening portion connected to an inlet port 7a (located inside the fuel pump 7 in FIG. 7 and is invisible) of the fuel pump 7, 8b denotes a screen portion for filtering the passing fuel 2, and 8c denotes a protector for preventing the rubbing against each other of the screen portion 8b and the inner bottom surface 5a of the sub-tank 5.

The sub-tank 5 is attached to prevent the fuel 2 from not being supplied to an unillustrated engine from the fuel pump 7 when the vehicle body is inclined in a state in which the amount of fuel 2 in the main tank 1 has become small. A discharge port 7b of the fuel pump 7 is connected to a main tube 10 by means of a rubber hose 9. The main tube 10 is bent downward, is oil-tightly passed through the setting plate 3, and is connected by a joint 14 to a delivery pipe 16 directed to the unillustrated engine. Further, a power supply line 11 having one end connected to a connector 12 outside the main tank 1 has its other end oil-tightly passed through the setting plate 3 and connected to a power supply terminal 13 of the fuel pump 7.

Next, a description will be given of the supply of the fuel 2. A voltage is applied from the power supply terminal 13 through the connector 12 and the power supply line 11 to drive the fuel pump 7, which in turn causes the fuel 2 in the main tank 1 to be sucked from the suction filter 8, and after the fuel 2 is pressurized by the fuel pump 7, the fuel 2 passes through the main tube 10 and is supplied to the delivery pipe 16 directed to the unillustrated engine.

However, with the above-described conventional fuel supplying apparatus for a vehicle, since the sub-tank 5 is cup-shaped with its upper surface 5b open, during quick braking when the acceleration acting in the vehicle becomes maximum the fuel inside the sub-tank 5 rides over the upper surface 5b of the sub-tank 5 and flows to outside the sub-tank 5. For this reason, there has been a problem in that when the amount of fuel 2 in the main tank 1 has become small, the fuel 2 fails to be supplied to the unillustrated engine by the fuel pump 7.

The present invention has been devised to overcome the above-describe problem, and its object is to obtain a fuel supplying apparatus for a vehicle which is capable of supplying fuel to the engine even when the vehicle is braked quickly.

DISCLOSURE OF THE INVENTION

In accordance with the present invention, a fuel supplying apparatus for a vehicle for supplying fuel, by means of an in-tank type fuel pump provided in a fuel tank, to outside the fuel tank through a pipe connected to the fuel pump, comprises: fuel holding means having an opening portion which is open in an opposite direction to a forwardly moving direction of the vehicle and formed so as to hold a predetermined amount of fuel in a vicinity of a fuel inlet portion of the fuel pump during the quick braking of the vehicle.

Further, the opening portion has a guide portion for guiding the fuel to the fuel holding means during the quick braking of the vehicle.

Further, the fuel holding means is a tubular case surrounding the fuel inlet portion of the fuel pump.

Further, a portion of the fuel holding means is disposed between the fuel tank and a suction filter portion provided in the fuel inlet portion of the fuel pump.

Furthermore, the fuel holding means is arranged such that a portion of a sealing member for sealing a gap between a setting plate, on which the fuel pump is disposed, and the fuel tank is formed in a concave shape for covering the fuel inlet portion of the fuel pump.

BEST MODE FOR CARRYING OUT THE INVENTION

Figure 1:
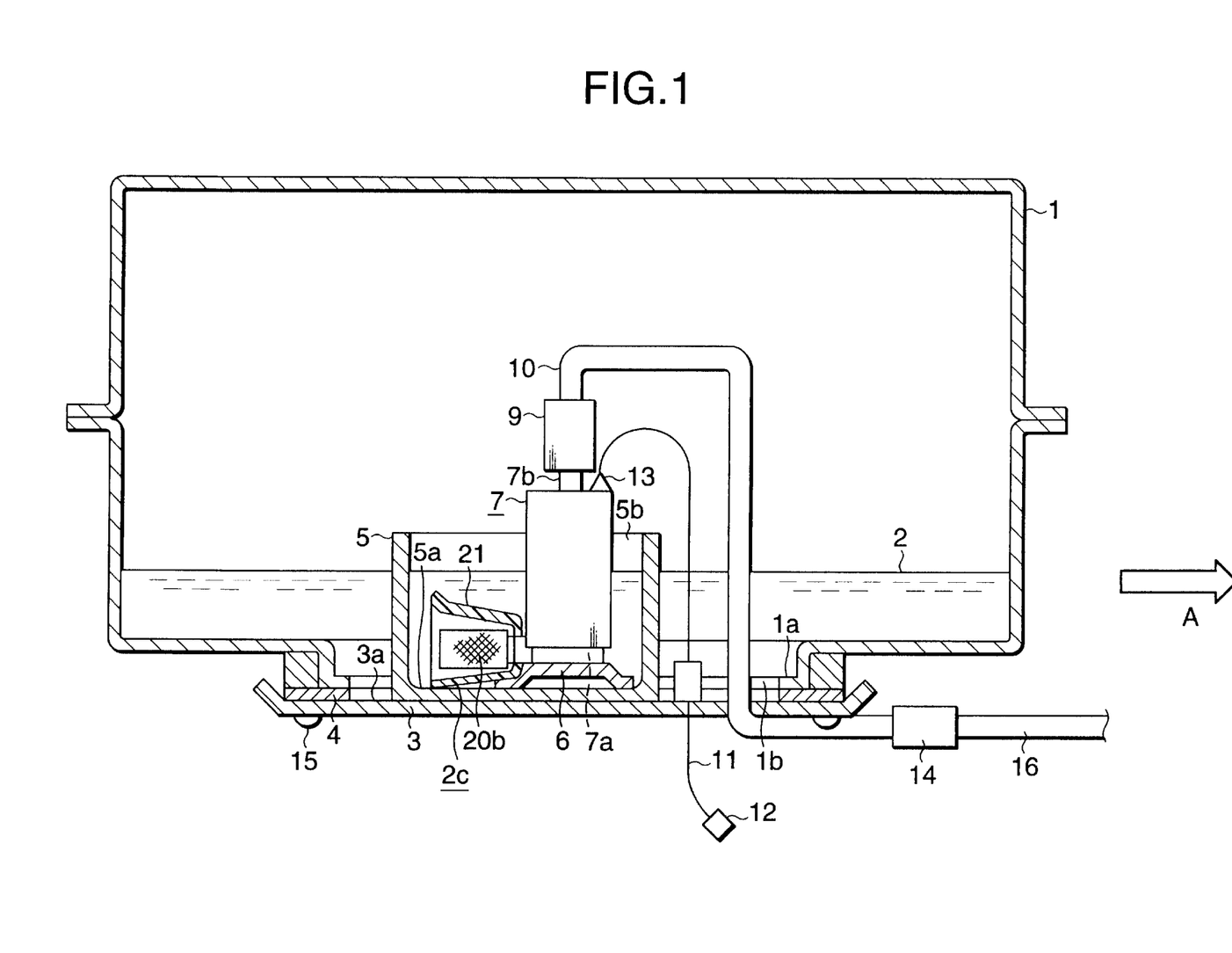
FIG. 1 is a side cross-sectional view of a fuel supplying apparatus for a vehicle in accordance with a first embodiment of the present invention.
Figure 2:
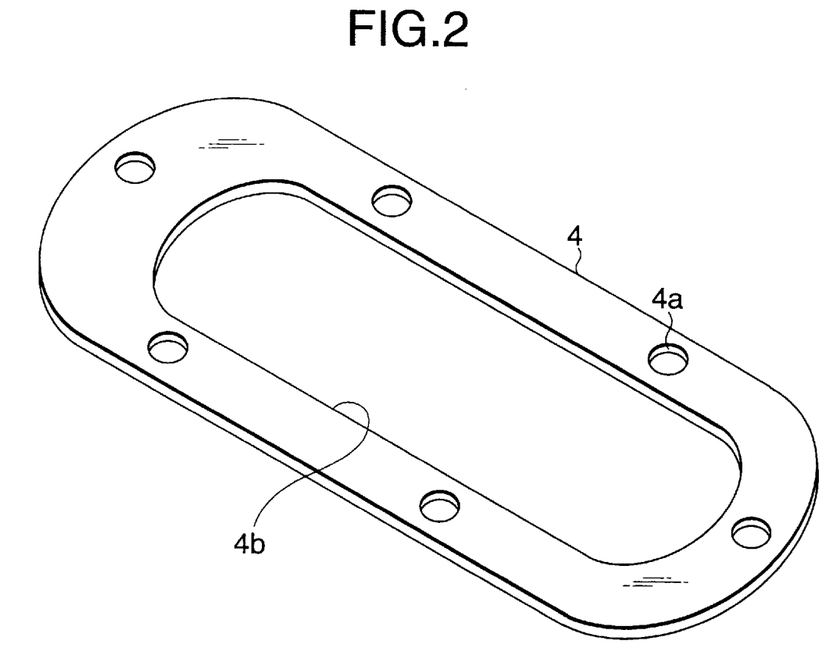
FIG. 2 is an enlarged perspective view of packing of the fuel supplying apparatus for a vehicle shown in FIG. 1.

Hereafter, a description will be given of the embodiments of the present invention. FIG. 1 is a side cross-sectional view of a fuel supplying apparatus for a vehicle in accordance with a first embodiment of the present invention. In FIG. 1, reference numeral 1 denotes a main tank (fuel tank) formed of, for instance, a steel plate and for storing fuel 2, 1a denotes a bottom wall of the main tank 1, and 1b denotes a bottom wall opening provided in the bottom wall 1a of the main tank 1. Numeral 3 denotes a setting plate which is formed of, for instance, a steel plate and is oil-tightly attached to the bottom wall opening 1b by means of bolts 15 through packing (sealing member) 4. FIG. 2 is an enlarged perspective view of the packing of the fuel supplying apparatus for a vehicle shown in FIG. 1. In FIG. 2, reference numeral 4a denotes a hole through which the bolt 15 is passed, and 4b denotes a hole through which a sub-tank (fuel tank) 5, a main tube 10, and a power supply line 11 are inserted.

The sub-tank 5 which is inserted in the main tank 1 is provided on an inner surface 3a of the setting plate 3, and an in-tank type fuel pump 7 which is attached by a pump holder 6 is provided on an inner bottom surface 5a of the sub-tank 5.

The sub-tank 5 is attached to prevent the fuel 2 from not being supplied to an unillustrated engine from the fuel pump 7 when the vehicle body is inclined in a state in which the amount of fuel 2 in the main tank 1 has become small. A discharge port 7b of the fuel pump 7 is connected to a main tube 10 by means of a rubber hose 9. The main tube 10 is bent downward, is oil-tightly passed through the setting plate 3, and is connected by a joint 14 to a delivery pipe 16 directed to the unillustrated engine. Further, a power supply line 11 having one end connected to a connector 12 outside the main tank 1 has its other end oil-tightly passed through the setting plate 3 and connected to a power supply terminal 13 of the fuel pump 7.

Figure 3:
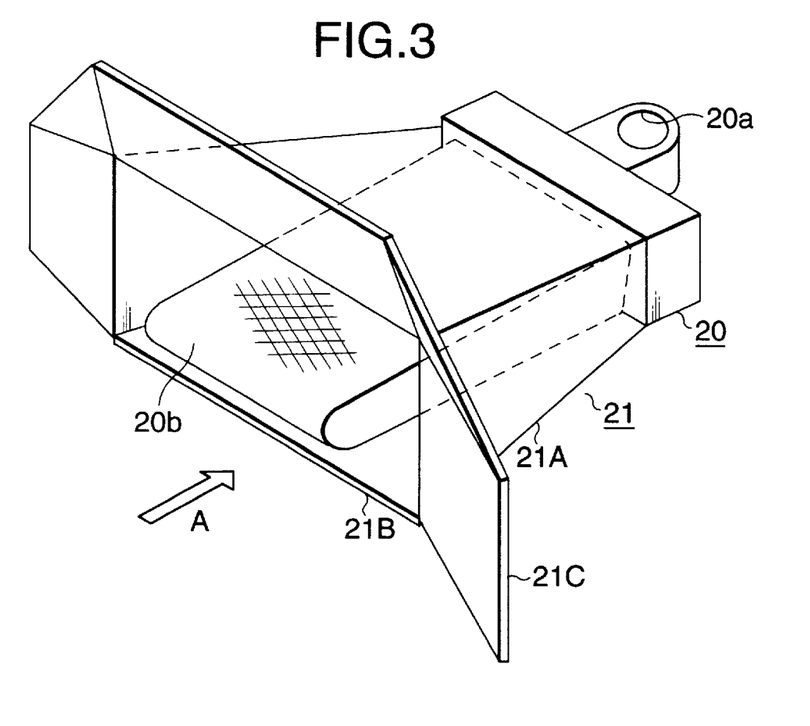
FIG. 3 is an enlarged perspective view of a suction filter of the fuel supplying apparatus for a vehicle shown in FIG. 1.

FIG. 3 is an enlarged perspective view of a suction filter portion of the fuel supplying apparatus for a vehicle shown in FIG. 1. In FIG. 3, numeral 20 denotes a suction filter portion (fuel inlet portion of the fuel pump 7), 20a denotes an opening portion connected to an inlet port 7a (located inside the fuel pump 7 in FIG. 1 and is invisible) of the fuel pump 7, and 20b denotes a screen portion for filtering the passing fuel 2. Numeral 21 denotes a fuel holding case (fuel holding means) which is attached to the suction filter portion 20 by means of unillustrated screws and is formed of a synthetic resin, such as nylon, in a tubular case shape. The fuel holding case 21 has a main body portion 21A surrounding the screen portion 20b of the suction filter portion 20 and for holding a predetermined amount of fuel 2 in the vicinity of the suction filter portion 20b during the quick braking of the vehicle; an opening portion 21B which is open in an opposite direction to the forwardly advancing (the direction of arrow A) of the vehicle; and a guide portion 21C for guiding the fuel 2 into the fuel holding case 21 during the quick braking of the vehicle. This fuel holding case 21 also has the function of a protector for preventing the rubbing against each other of the screen portion 20b and the inner bottom surface 5a of the sub-tank 5.

Here, the forwardly advancing of the vehicle generally means the direction in which the driver faces the front. In addition, the main body portion 21A suffices if it has such an arrangement and a structure that it is capable of holding a predetermined amount of fuel 2 in the vicinity of the suction filter portion 20b during the quick braking of the vehicle, and capable of supplying the held fuel 2 to a suction filter portion 8 at least in an amount which can be sucked by the fuel pump 7. In addition, the opening portion which is open in an opposite direction to the forwardly advancing of the vehicle suffices if it is arranged such that the opening plane formed by the opening portion 21B can be at least seen from the opposite direction to the forwardly advancing of the vehicle. In other words, this means that the arrangement may be such that the opening plane of the opening portion 21B, when viewed from the opposite direction to the forwardly advancing of the vehicle, is inclined. However, the arrangement in which, as shown in FIG. 1, the opening plane of the opening portion 21B is substantially orthogonal to the opposite direction to the forwardly advancing of the vehicle is preferable in view of the efficiency with which the fuel 2 is held and because effective use can be made of the limited space in the sub-tank 5. In addition, although a description has been given of the example in which the fuel holding case 21 is fixed to the suction filter portion 20 by means of the screws, this fixation may be fixation based on an adhesive agent, fixation based on ultrasonic welding, or fixation based on press fitting. Meanwhile, the fuel holding case 21 may be formed integrally on the suction filter 20. As shown in FIG. 3, if the fuel holding case 21 and the suction filter portion 20 are formed separately, the fuel holding case 21 can be replaced. Further, the fuel holding case 21 in accordance with the present invention can be attached to an existing fuel driving apparatus for a vehicle. In addition, although the fuel holding case 21 shown in FIG. 3 is arranged so that only the opening portion 21B is open, it suffices if the fuel holding case 21 is arranged to be capable of holding the fuel 2 during the quick braking of the vehicle, and openings other than the opening portion 21B may be provided in the main body portion 21A.

Next, a description will be given of the supply of the fuel 2. A voltage is applied from the power supply terminal 13 through the connector 12 and the power supply line 11 to drive the fuel pump 7, which in turn causes the fuel 2 in the main tank 1 to be sucked from the suction filter portion 20, and after the fuel 2 is pressurized by the fuel pump 7, the fuel 2 passes through the main tube 10 and is supplied to the delivery pipe 16 directed to the unillustrated engine. Then, when the vehicle is braked quickly in a state in which the amount of fuel 2 has become small, even if the fuel 2 in the sub-tank 5 rides over an upper surface 5b of the sub-tank 5 and flows to outside the sub-tank 5, the fuel 2 which can be sucked by the fuel pump 7 still remains in the fuel holding case 21, so that the fuel 2 is supplied to the delivery pipe 16 directed to the unillustrated engine.

With the fuel supplying apparatus for a vehicle constructed as described above, when the vehicle is braked quickly in the state in which the amount of fuel 2 has become small, even if the fuel 2 in the sub-tank 5 rides over the upper surface 5b of the sub-tank 5 and flows to outside the sub-tank 5, the fuel 2 which can be sucked by the fuel pump 7 remains in the fuel holding case 21, so that the fuel 2 can be supplied even during the quick braking of the vehicle.

In addition, since the guide portion 21C is provided for guiding the fuel 2 to inside the fuel holding case 21 during the quick braking of the vehicle, the fuel 2 can be reliably moved to and held in the fuel holding case 21.

In addition, since the fuel holding case 21 is a tubular case surrounding the suction filter portion 20 of the fuel pump 7, there is practically no risk of causing damage to the screen portion 20b when the fuel pump 7 is assembled to the main tank 1 in the state in which the fuel holding case 21 is attached to the suction filter portion 20.

In addition, since the fuel holding case 21 also has the function of the protector for preventing the rubbing against each other of the screen portion 20b and the inner bottom surface 5a of the sub-tank 5, there is no possibility of causing damage to the screen portion 20b, and the number of component parts does not increase.

In addition, since the fuel holding case 21 has the structure of a tubular case, as compared with a conventional protector 8c (FIG. 7) the fuel holding case 21 has large mechanical strength against vibrations, deflection in the vertical direction (axial direction of the fuel pump 7) of the main tank 1, and the like, so that its thickness can be made sufficiently small as compared with the conventional protector 8c (FIG. 7). Accordingly, it becomes possible to dispose the screen portion 20b at a position closer to the bottom surface of the sub-tank 5, i.e., at a lower position in the sub-tank 5, so that the fuel 2 can be supplied to the unillustrated engine until the level of fuel 2 becomes much lower.

Furthermore, as for the fuel holding case 21, a description has been given of the case in which the length, as viewed in the advancing direction of the vehicle, of the tubular case surrounding the suction filter portion 20 for the fuel pump 7 is substantially the same as the length of the screen portion 20b, and yet it suffices if the fuel holding case 21 has such a length that a predetermined amount of fuel 2 can be held therein. This being the case, however, it is preferred that the length of the tubular case in the advancing direction of the vehicle be substantially the same as the length of the screen portion 20b because the fuel holding case 21 can also demonstrate the protector function and because damage to the screen portion 20b can be prevented when the fuel pump 7 is built in the main tank 1.

Figure 4:
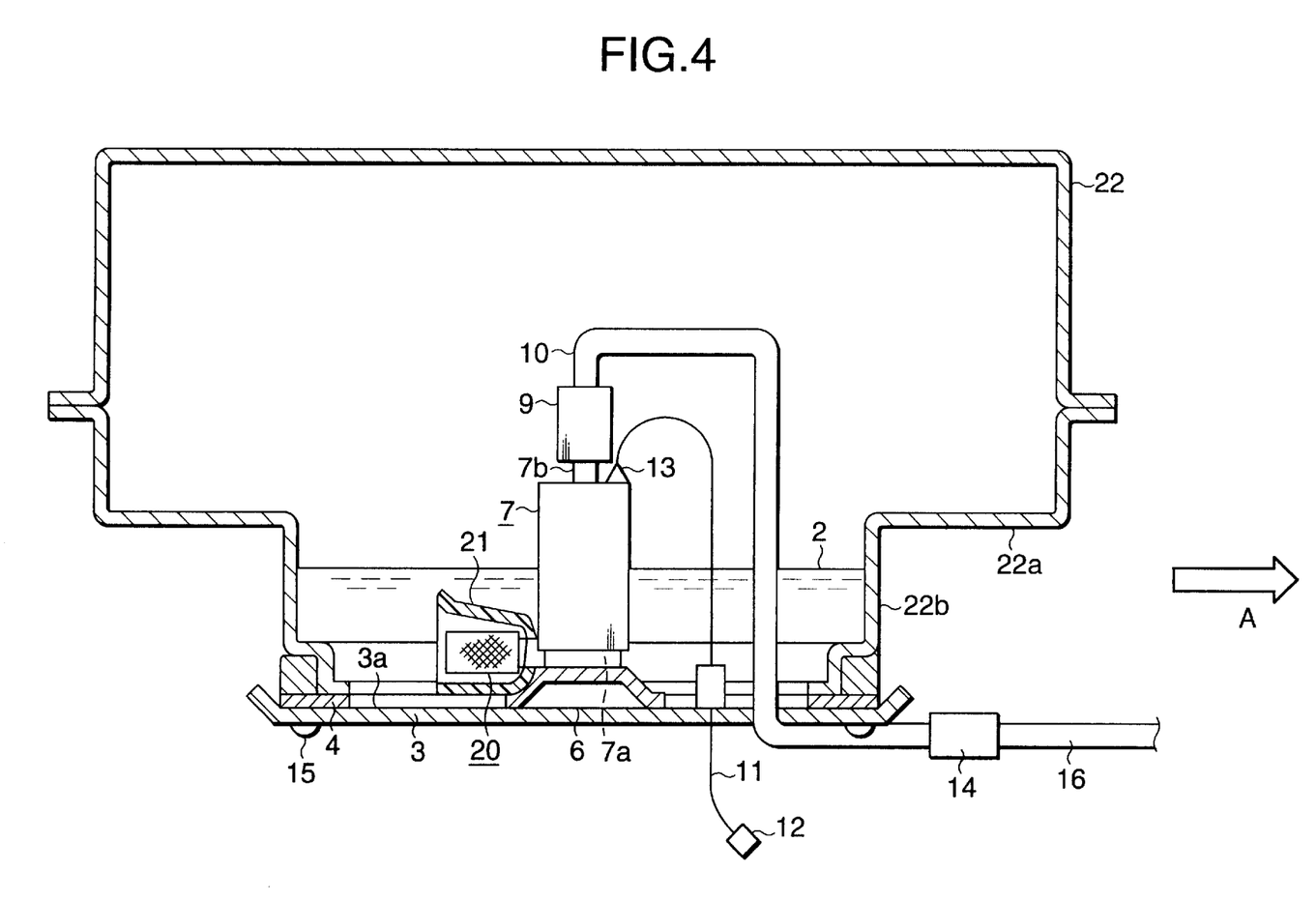
FIG. 4 is a side cross-sectional view of the fuel supplying apparatus for a vehicle in accordance with another embodiment of the present invention.

Next, a description will be given of another embodiment of the present invention. FIG. 4 is a side cross-sectional view of the fuel supplying apparatus for a vehicle in accordance with another embodiment of the present invention. In FIG. 4, a main tank 22 has a concavely shaped portion 22b in which a portion of a bottom wall 22a of a main tank 22 is shaped in a concave shape, and the suction filter portion 20 incorporating the fuel holding case 21 is built inside this concavely shaped portion 22b. Since the other arrangements are similar to those of the foregoing embodiment, a description thereof will be omitted. By using the concavely shaped portion 22b of the bottom wall 22a of the main tank 22 and the fuel holding case 21, the vessel (sub-tank 5 in FIG. 1) can be disused, the number of component parts can be curtailed, and it is possible to obtain advantages similar to those of the above-described first embodiment.

Figure 5:
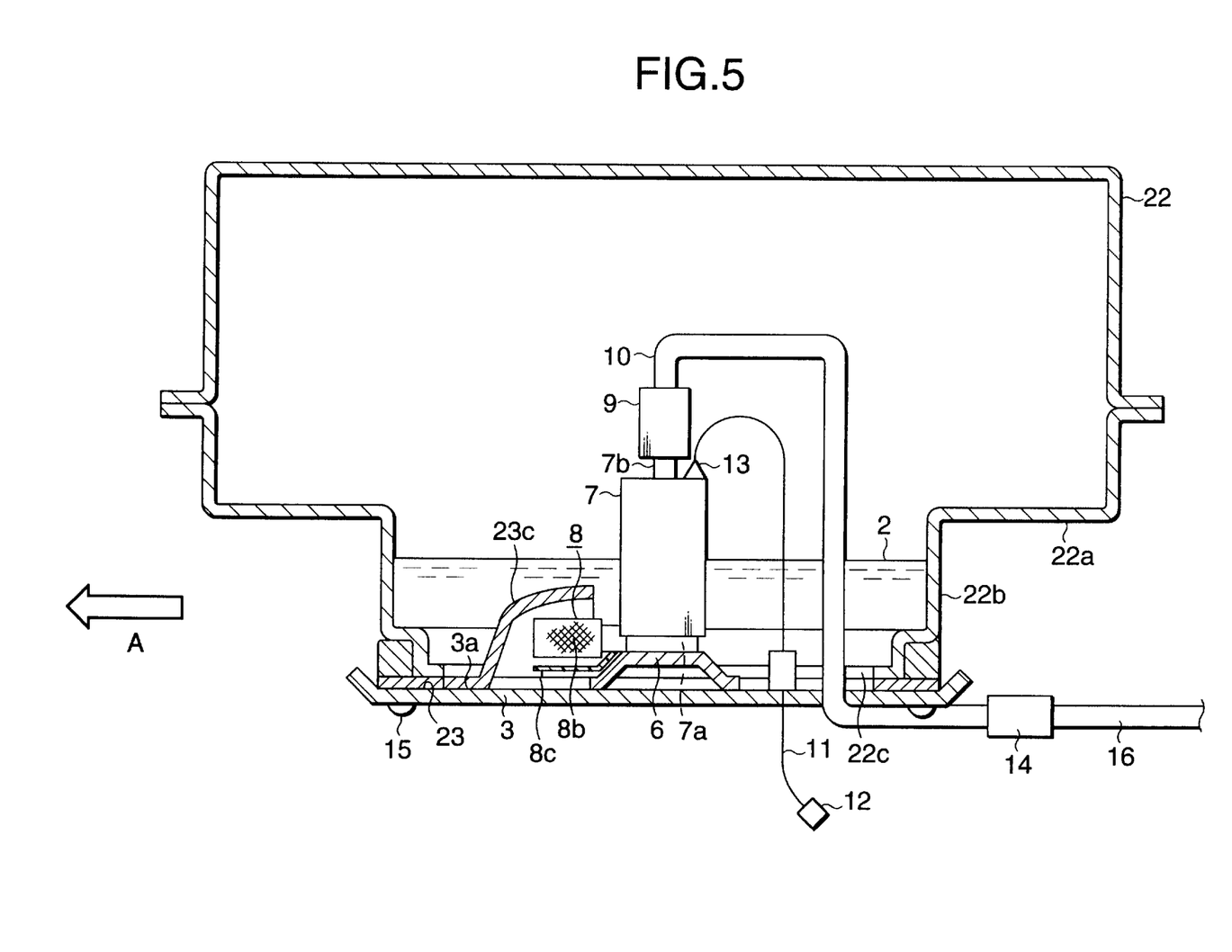
FIG. 5 is a side cross-sectional view of the fuel supplying apparatus for a vehicle in accordance with still another embodiment of the present invention.
Figure 6:
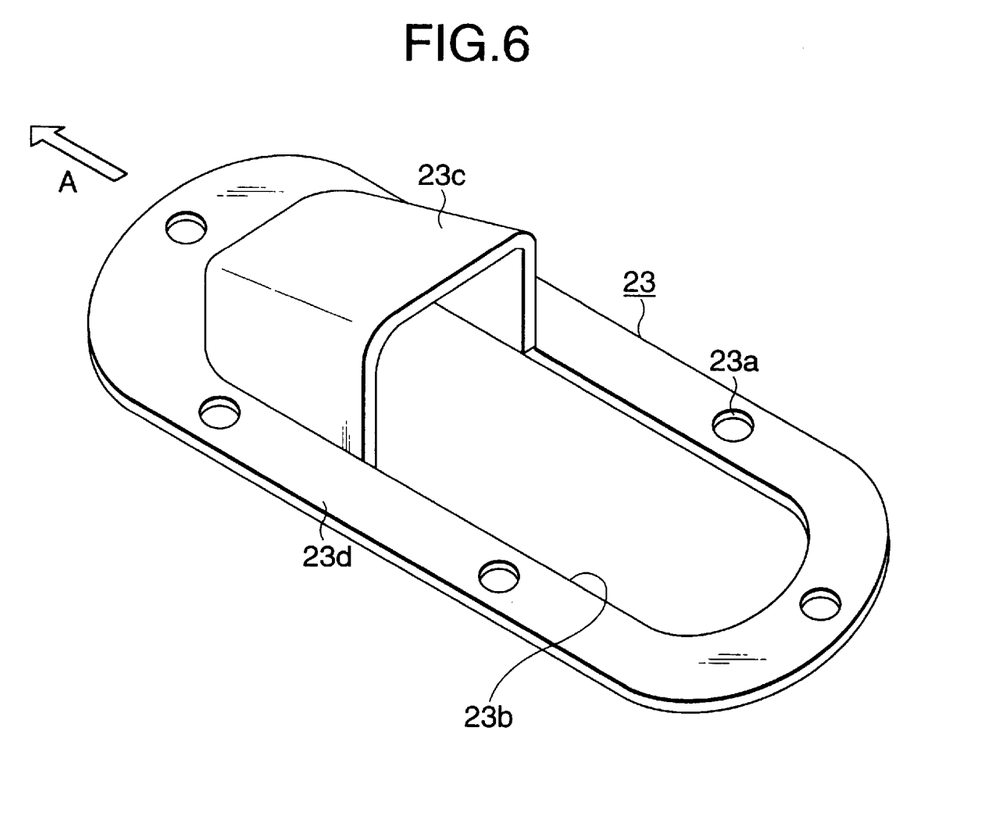
FIG. 6 is an enlarged perspective view of packing (sealing member) of the fuel supplying apparatus for a vehicle shown in FIG. 5.

Next, a description will be given of still another embodiment of the present invention. FIG. 5 is a side cross-sectional view of the fuel supplying apparatus for a vehicle in accordance with still another embodiment of the present invention. FIG. 6 is an enlarged perspective view of packing (sealing member) of the fuel supplying apparatus for a vehicle shown in FIG. 5. In FIGS. 5 and 6, the main tank 22 has the concavely shaped portion 22b in which a portion of the bottom wall 22a is shaped in a concave shape, and an opening 22c is provided in the bottom wall 22a of this concavely shaped portion 22b. Numeral 23 denotes packing (sealing member) which is attached to the aforementioned opening 22c with a seal portion 23d being clamped by the setting plate 3 and the main tank 22. Numeral 23a denotes a hole through which the bolt 15 is passed, 23b denotes a hole through which the pump holder 6, the main tube 10, and the power supply line 11 are inserted. Numeral 23c denotes a fuel holding portion (fuel holding means) which covers a screen portion 8b of the suction filter 8 and is open in the opposite direction to the forwardly advancing (the direction of arrow A) of the vehicle. Since the other arrangements are similar to those of the foregoing embodiments, a description thereof will be omitted.

With the fuel supplying apparatus for a vehicle constructed as described above, since the fuel 2 which can be sucked by the fuel pump 7 can be pooled inside the fuel holding portion 23c, it is possible to use the conventional suction filter portion 21, and the fuel 2 can be held without an increase in the number of component parts. In addition, since the fuel holding portion 23c of a size corresponding to the inside diameter of the packing 23 can be formed, the fuel holding portion 23c can be made large, so that the fuel 2 can be reliably supplied to the unillustrated engine during the quick braking of the vehicle.

It should be noted that the fuel supplying apparatus for a vehicle in each embodiment described above can be applied to both four-wheeled and two-wheeled vehicles, but is useful particularly for a two-wheeled vehicle for the following reason. The reason is that since the engine is disposed on the front side (front side in the forwardly moving direction of the vehicle), the fuel pump 7 is frequently disposed rearwardly of the center of the main tank 1 so as to avoid the effect of heat from the engine.

In addition, since the structure provided such is that the fuel holding case 21 is provided in the sub-tank 5 or the concavely shaped portion 22b, the fuel 2 held in the fuel holding case 21 or the fuel holding portion 23c is spread to become level inside the sub-tank 5 or the concavely shaped portion 22b after the quick braking of the vehicle, so that the fuel 2 can be held efficiently by a compact fuel holding case 21. If the sub-tank 5 or the concavely shaped portion 22b is not provided, the fuel 2 held in the fuel holding case 21 or the fuel holding portion 23c is spread to become level inside the main tank 1 after the quick braking of the vehicle, so that a very large fuel holding case 21 or fuel holding portion 23c becomes necessary.

Industrial Applicability

The fuel supplying apparatus for a vehicle in accordance with the present invention is provided with the fuel holding means having an opening portion which is open in an opposite direction to the forwardly moving direction of the vehicle and formed so as to hold a predetermined amount of fuel in the vicinity of a fuel inlet portion of the fuel pump during the quick braking of the vehicle. Therefore, the fuel can be supplied to the engine even when the vehicle is braked quickly in a state in which the amount of fuel has become small.

Further, since the opening portion has a guide portion for guiding the fuel to the fuel holding means during the quick braking of the vehicle, the fuel can be held reliably.

Further, since the fuel holding means is a tubular case surrounding the fuel inlet portion of the fuel pump, the mechanical strength is high and the apparatus can be made compact.

Further, since a portion of the fuel holding means is disposed between the fuel tank and the suction filter portion provided in the fuel inlet portion of the fuel pump, it is possible to prevent he suction filter portion from striking the bottom wall of the fuel tank, and the possibility of the suction filter portion becoming damaged at the time of attachment of the fuel pump is reduced further.

Furthermore, since the fuel holding means is arranged such that a portion of a sealing member for sealing a gap between the setting plate, on which the fuel pump is disposed, and the fuel tank is formed in a concave shape for covering the fuel inlet portion of the fuel pump, the fuel can be supplied to the engine even when the vehicle is braked quickly without an increase in the number of component parts.

What is claimed is:

1. A fuel supplying apparatus for a vehicle for supplying fuel, by means of an in-tank type fuel pump provided in a fuel tank, to outside said fuel tank through a pipe connected to said fuel pump, comprising:

fuel holding means having an opening portion which is open in an opposite direction to a forwardly moving direction of the vehicle and formed so as to hold a predetermined amount of fuel in a vicinity of a fuel inlet portion of said fuel pump during the quick braking of the vehicle.

2. The fuel supplying apparatus for a vehicle according to claim 1, wherein said opening portion has a guide portion for guiding the fuel to said fuel holding means during the quick braking of the vehicle.

3. The fuel supplying apparatus for a vehicle according to claim 1, wherein said fuel holding means is a tubular case surrounding said fuel inlet portion of said fuel pump.

4. The fuel supplying apparatus for a vehicle according to claim 3, wherein a portion of said fuel holding means is disposed between said fuel tank and a suction filter portion provided in said fuel inlet portion of said fuel pump, and an axial direction of said tubular case is disposed along said fuel tank.

5. The fuel supplying apparatus for a vehicle according to claim 3, wherein said opening portion has a guide portion for guiding the fuel to said fuel holding case during the quick braking of the vehicle.

6. The fuel supplying apparatus for a vehicle according to claim 1, wherein said fuel holding means is arranged such that a portion of a sealing member for sealing a gap between a setting plate, on which said fuel pump is disposed, and said fuel tank is formed in a concave shape for covering said fuel inlet portion of said fuel pump.

7. The fuel supplying apparatus for a vehicle according to claim 1, wherein said opening portion is defined in a vicinity of a bottom surface of said fuel tank.

8. The fuel supplying apparatus for a vehicle according to claim 1, wherein said fuel holding means is closed except for said opening portion.

9. The fuel supplying apparatus for a vehicle according to claim 1, further comprising a suction filter portion provided in said fuel inlet portion of said fuel pump, wherein said fuel holding means is at least as long as said suction filter portion.

10. The fuel supplying apparatus for a vehicle according to claim 1, further comprising a sub-tank disposed within said fuel tank, wherein said fuel tank has a concave shaped portion and said fuel holding means is disposed within one of said sub-tank and said concave shaped portion.

* * * * *